US005602673A

United States Patent [19]

Swan

[11] Patent Number: 5,602,673

[45] Date of Patent: Feb. 11, 1997

[54] OPTICAL ISOLATOR WITHOUT POLARIZATION MODE DISPERSION

[75] Inventor: Clarence B. Swan, Lower Macungie Township, Lehigh County, Pa.

[73] Assignee: Lucent Technologies Inc., Murray Hill, N.J.

[21] Appl. No.: 175,068

[22] Filed: Dec. 29, 1993

[51] Int. Cl.[6] .................... G02B 5/30

[52] U.S. Cl. .................... 359/281; 359/484; 359/495; 359/496; 359/497

[58] Field of Search .................... 359/280, 281, 359/282, 283, 484, 494, 495, 496, 497; 372/703

[56] References Cited

U.S. PATENT DOCUMENTS

| | | | |
|---|---|---|---|
| 4,178,073 | 12/1979 | Uchida et al. . | |
| 4,464,022 | 8/1984 | Emkey . | |
| 4,548,478 | 10/1985 | Shirasaki . | |
| 4,712,880 | 12/1987 | Shirasaki . | |
| 5,111,330 | 5/1992 | VanDelden et al. . | |
| 5,151,955 | 9/1992 | Ohta et al. | 359/282 |
| 5,237,445 | 8/1993 | Kuzuta | 359/484 |
| 5,267,078 | 11/1993 | Shirasshi et al. | 359/282 |
| 5,315,431 | 5/1994 | Masuda et al. | 359/484 |
| 5,402,509 | 3/1995 | Fukushima | 359/281 |
| 5,446,578 | 8/1995 | Chang et al. | 359/484 |

FOREIGN PATENT DOCUMENTS

| | | | |
|---|---|---|---|
| 0054411 | 12/1981 | European Pat. Off. . | |
| 0533398A1 | 9/1992 | European Pat. Off. . | |
| 0176721 | 10/1984 | Japan | 359/484 |
| 0020016 | 1/1986 | Japan | 359/484 |
| 0130920 | 6/1986 | Japan | 359/484 |
| 0105908 | 4/1989 | Japan | 359/484 |
| 1291212 | 2/1990 | Japan . | |
| 0044310 | 2/1990 | Japan | 359/484 |
| 4073712 | 3/1992 | Japan | 359/484 |
| 6011664 | 1/1994 | Japan . | |

OTHER PUBLICATIONS

Matsumoto, "Polarization–Independent Isolators for Fiber Optics", Electronics and Communications in Japan, vol. 62–C, No. 7, 1979, pp. 113–116.

Compact optical isolator for fibers using birefringent wedges Applied Optics/ vol. 21, No. 23/ 1 Dec. 1982 pp. 4296–4299.

Polarization Independent Isolator Using Spatial Walkoff Polarizers IEEE Photonics Technology Letters, vol. 1. No. 3, Mar. 1989 pp. 68–70.

*Primary Examiner*—Ricky D. Shafer

[57] ABSTRACT

An optical isolator utilizes a pair of polarization selective elements, as for example birefringent wedges, and all integral Faraday rotator aligned therewith to perform optical signal isolation without introducing the polarization mode dispersion inherent in conventional polarization independent optical isolators. Optical isolation is accomplished by passing a forward-directed optical signal through a first birefringent element which separates the optical signal into two orthogonal states. The two orthogonal polarization states exchange identities upon entering the second birefringent element from the Faraday rotation element and are again deflected by the second birefringent element so that they emerge from the second element parallel to each other and, having traveled the same optical path length, witllout any polarization mode dispersion. Both polarization states of the reverse propagating optical signal are sufficiently angularly deflected to avoid coupling with the optical signal path.

10 Claims, 3 Drawing Sheets

46 14 12 16 50 $\alpha_1$ $\alpha_2$ o e e o oe eo

OPTICAL ISOLATOR WITHOUT POLARIZATION MODE DISPERSION

BACKGROUND OF THE INVENTION

1. Technical Field

The present invention relates to an optical isolator which performs optical isolation with substantially no polarization mode dispersion.

2. Description of the Prior Art

Reflecting in optical systems often generate noise and optical feedback which may degrade the performance of various system components, particularly semiconductor lasers. Therefore, the ability to optically isolate lasers and other sensitive components from these reflections is critical to the performance of the system. The Faraday effect in magneto-optic material enables the construction of a unique non-reciprocal device capable of performing the isolation function.

To reduce the insertion loss for coupled fibers, an isolator should operate independent of the polarization state of the applied signal. In general, a conventional optical isolator comprises a 45° Faraday rotator encased within a bias magnet and disposed between a pair of polarization selective means (e.g. birefringent plates, or birefringent wedges) oriented at an angle of 45° to each other. The combination provides optical isolation in the reverse direction because the Faraday rotation means causes the two polarization states to switch identities as they pass through the birefringent devices.

One arrangement for eliminating polarization dependence is discussed in the article "*Compact Optical Isolator For Fibers Using Birefringent Wedges*", by M. Shirasaki et al., 21 Applied Optics 4296-99 (1982). In particular, Shirasaki et al. utilize a pair of birefringent wedges, located at the input and output of the Faraday rotator, to separate an incident beam into orthogonal, linear polarizations which travel independently through the isolator. Signals passing through the isolator in the forward transmitting direction will be essentially unaffected by the bireffingent wedges and Faraday rotator whereas, in the reverse direction, both polarization states undergo angular deviation so that neither polarization state is coupled to the input signal path of the isolator. Although the Shirasaki et al. arrangement, and other commercially available isolators, may be polarization independent, they can exhibit polarization mode dispersion in that the propagation time of a ray through the birefringent material is a function of its polarization state (i.e. extraordinary polarization state or ordinary polarization state). In particular, the birefringent material will have a different refractive index for each polarization state. As a result, a net dispersion (i.e. propagation delay between polarization states) that can be on the order of picoseconds will exist as the rays emerge from the isolator.

The net polarization mode dispersion At is calculated according to the formula:

$$\Delta t = \frac{L}{c}(n_e - n_o) \qquad \text{Equation 1}$$

where L is the total path length in the two wedges, c is the speed of light in free space, $n_o$ is the refractive index seen by the ordinary ray, and $n_e$ is the refractive index seen by the extraordinary ray.

For a standard Type 25 or Type 26 isolator manufactured by AT&T, which utilizes rutile material ($n_o$=2.454 and $n_e$=2.710), the net dispersion becomes:

$$\Delta t = \frac{1.3 \times 10^{-3}}{3 \times 10^{8}}(2.710 - 2.454) = 1.1 \text{ picoseconds.}$$

For some applications, such as cascaded amplifiers in undersea systems, this degree of dispersion may present a serious problem. Accordingly, various techniques have been attempted in order to compensate for this dispersion through the inclusion of one or more additional compensation elements added to the isolator.

A need nevertheless remains in the art for a simple and effective optical isolation means that introduces substantially no polarization mode dispersion and which therefore requires no polarization mode dispersion correction.

SUMMARY OF THE INVENTION

The need remaining in the prior art is addressed and successfully satisfied by the present invention which provides an optical isolator that requires no supplemental polarization mode dispersion correction.

In a preferred embodiment of the invention, an optical isolator comprises a Faraday rotation means interposed between two polarization selective means which, in the most preferred case, are a pair of rutile birefringent wedges. The birefringent wedges split the optical signal into orthogonal polarization states, i.e. ordinary and extraordinary signals, and their optical axes (C-axes) are oriented such that, in combination with the 45° polarization rotation (nonreciprocal) associated with the Faraday rotation means, the polarization states of a signal propagating through the isolator in the forward direction exchange identities as they pass through the birefringent devices.

The optical axis (C-axis) of the second birefringent device is rotated counterclockwise by an angle of 45° with respect to the optical axis of the first birefringent device. The interposed Faraday rotator rotates the transmitted light signal by an angle of 45° in the clockwise direction. As a result, the polarization states of a signal propagating through the isolator in the forward direction exchange identities as they enter the second birefringent device from the Faraday rotator (i.e. the ordinary ray emerging from the first birefringent device will emerge from the second birefringent device as the extraordinary ray and vice versa). As a result, the ordinary and extraordinary rays exit the second birefringent device parallel to one another with substantially no polarization mode dispersion. Although the optical isolator of the present invention introduces a net beam deflection, since the rays are parallel, they can both be simultaneously focused on a fiber. Compensation for this deflection may be readily provided by means known in the art and not forming a part of the present invention such, for example, as by using beveled graded index lenses or by appropriately aligning or tilting the input and output fiber and lens assemblies.

The optical isolator of the present invention provides the requisite optical isolation in the reverse direction since the Faraday rotation means causes the two polarization states to retain their identities in passing through the birefringent devices (i.e. the reverse directed ordinary ray retains its identity passing from the second birefringent device through the Faraday rotator and into the first birefringent device, as does the extraordinary ray). The result is that the reverse directed ordinary ray and extraordinary ray experience different total angular deviations which are both directed away from the signal path of the isolator. Consequently, neither polarization state is coupled to the input signal path.

In further accordance with a preferred embodiment of the present invention, the lengths of the paths of the ordinary ray and the extraordinary ray are equalized such that they exit the isolator with substantially no net dispersion—i.e. with substantially no propagation delay difference between the two polarization states.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
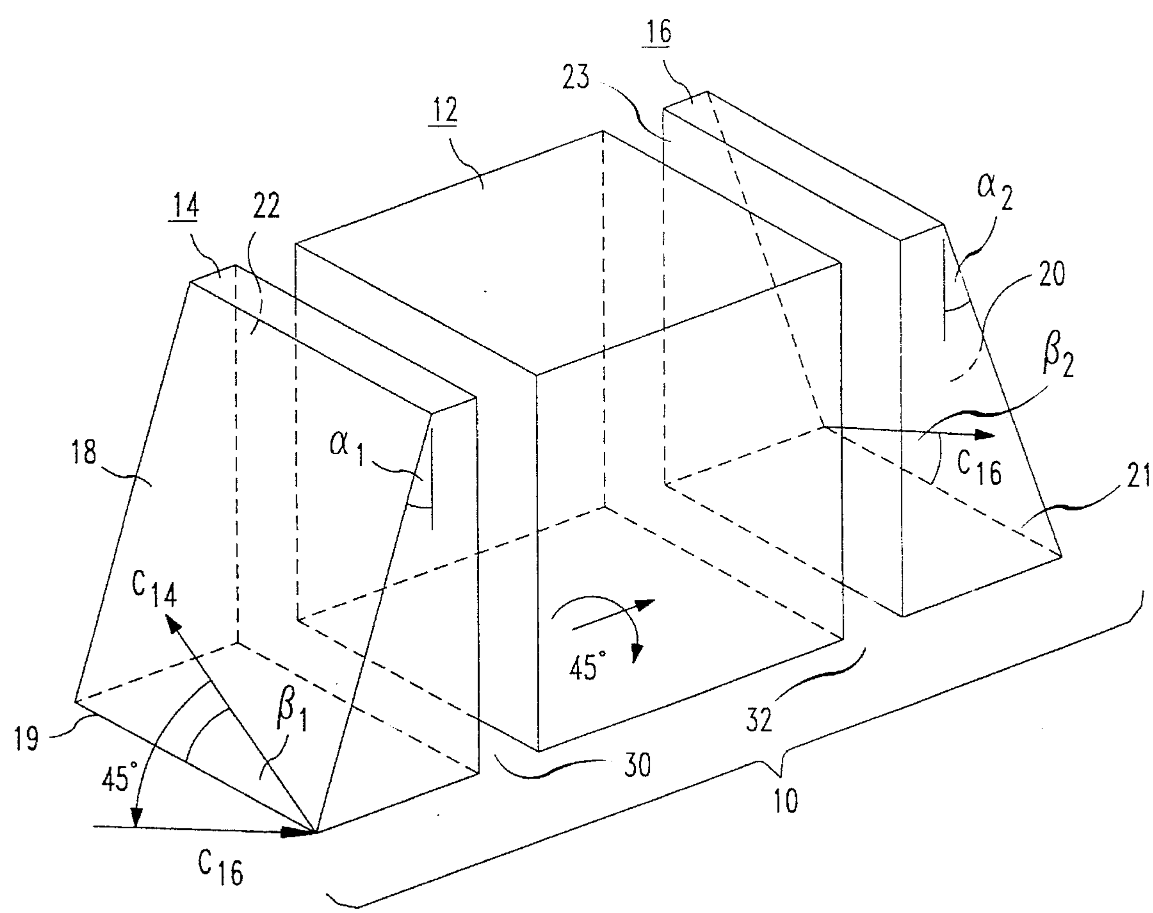
FIG. 1 illustrates an exemplary polarization dispersion optical isolator formed in accordance with the teachings of the present invention.

FIG. 1 illustrates a simplified drawing of a first embodiment of the optical isolator 10 of the present invention. It should be understood and apparent to those skilled in the art that, in actual operation, such an isolator additionally requires a niagnet or magnets appropriately positioned about the illustrated structure and may also include correction elements, all as discussed hereinbelow in association with FIGS. 2 and 3. For the sake of clarity, however, these other components are not shown in FIG. 1 and are not necessary for understanding the operation of the inventive isolator arrangement.

Referring to FIG. 1, the isolator 10 includes a Faraday rotator 12 (fabricated, for example, of Yttrium Iron Garnet (YIG) crystal or bismuth-substitutecl YIG) disposed between a pair of polarization selective means 14, 16. The polarization selective means 14, 16 may be fabricated of, for example, rutile, lithium niobate, calcite or other birefringent material and comprise a pair of birefringent wedges. The optical axis (C-axis) $C_{14}$ of birefringent device 14 is oriented at an angle $\beta_1$ with respect to edge 19 of wedge 14, while the C-axis $C_{16}$ of birefringent device 16 is oriented at an angle $\beta_2$ with respect to edge 21 of wedge 14. Birefringent device 16 is selected and oriented so that the C-axis $C_{16}$ of birefringent device 16 is rotated counterclockwise by an angle of 45° relative to the C-axis $C_{14}$ of birefringent device 14. For example, for the preferred embodiment shown in FIG. 1, because edge 19 and edge 21 are parallel to one another and because the optical isolator is linear in that the wedges 14, 16 and the Faraday rotator 12 are linearly aligned, the angular separation between the C-axis $C_{14}$ of wedge 14 and the C-axis $C_{16}$ of wedge 16 may be obtained by merely adding the values of $\beta_1$ and $\beta_2$ as shown in FIG. 1. Thus, for example, $\beta_1$ and $\beta_2$ may both be equal to +22.5°, as shown in FIG. 1, $\beta_1$ may be equal to 0° and $\beta_2$ may be equal to +45°, or $\beta_1$ may equal −10° and $\beta_2$ may equal +55°. Faraday rotator 12 is a device well-known in the art and is selected to provide a nonreciprocal clockwise rotation of 45° of the polarization of an optical signal passing therethrough. Such a rotation corresponds to a clockwise rotation with respect to the forward propagating direction of the optical signal. Thus, as discussed in greater detail below, because of the counterclockwise 45° rotation of the optical axis of the second wedge 16 relative to that of the first wedge 14 in combination with a clockwise 45° rotation by the Faraday rotator 12, a transmitted optical signal will pass relatively unimpeded in the forward or transmitting direction through the isolator 10, while a reverse propagating, reflected optical signal will be sufficiently deflected by the isolator 10 that it will not re-enter the optical signal path.

The two polarization states (extraordinary and ordinary) of a transmitted optical signal exhibit different transit times as they propagate through each of the birefringent wedges 14 and 16. Preferably, the birefringent material is rutile (i.e. crystalline titanium dioxide ($TiO_2$)) although other known materials, such as lithium niobate and calcite, may be used. For rutile, the refractive index $n_e$ for an extraordinary ray is slightly greater than the refractive index $n_o$ for an ordinary ray traveling through the same material. The refractive index of a birefringent material is defined as the ratio of the signal's velocity in free space with respect to the velocity in the birefringent material. For rutile wedges utilized with an input lightwave at $\lambda$=1.5 μm, $n_e$ is approximately 2.710 and $n_o$ is approximately 2.454.

The first polarization selective means or birefringent wedge 14 has a surface 18 beveled at an angle $\alpha_1$ with respect to planar surface 22 and separates an incoming or applied optical signal into an ordinary ray and an associated orthogonal extraordinary ray. The ordinary and extraordinary rays will be deflected by the wedge 14 by different amounts in accordance with the respective $n_o$ and $n_e$ of the polarization selective means 14.

A Faraday rotator 12 is positioned so that it is juxtaposed or adjacent to the polarization selective means 14 so that the planar surface 22 is adjacent the Faraday rotator 12. The Faraday rotator 12 is used to rotate the ordinary and extraordinary rays emerging therefrom by 45° and to ensure that the ordinary and extraordinary rays passing in the reverse direction will be deflected such that neither will couple with the input signal path.

A second polarization selective means or birefringent wedge 16, having a surface 20 beveled at an angle $\alpha_2$ with respect to planar surface 23, is positioned so that it is following and is juxtaposed or adjacent to the Faraday rotator 12. Birefringent wedge 16 further deflects the light signal in accordance with the refractive indices $n_e$ and $n_o$ of the second means 16. The orientation of the C-axis $C_{16}$ of the second wedge 16 relative to the C-axis $C_{14}$ of the first wedge 14 combined with the 45° rotation caused by the Faraday rotator 12 cause the extraordinary ray leaving the first wedge 14 to be treated as an ordinary ray upon entering the second wedge 16 and cause the ordinary ray leaving the first wedge 14 to be treated as an extraordinary ray upon entering the second wedge 16. Consequently, the two polarization states of the optical signal exchange identities and the forward-directed ordinary and extraordinary rays emerging from the second means 16 will thus have experienced a net deflection relative to the input optical signal but will be parallel to each other with substantially no net polarization mode dispersion. Polarization mode dispersion is essentially eliminated by utilizing the resulting exchange of identities of the extraordinary and ordinary rays thereby equalizing the time required for the extraordinary and ordinary rays to traverse the isolator 10. As a consequence, there is substantially no net time delay of the extraordinary ray relative to the ordinary ray when they emerge from the birefringent wedge 16, i.e. there is substantially no polarization mode dispersion introduced between the input and output ends of the isolator 10.

The ability of the optical isolator of the present invention to isolate an incident beam from a reflected beam can be demonstrated mathematically. Assuming that an incident beam enters the isolator at an angle of 0°, that the two birefringent wedges 14, 16 are made of the same material, and that any spaces between an adjacent isolator elements is air filled with a refractive index of 1.0, the net deflection in the forward direction between the input and output rays by the isolator 10 of the present invention may be calculated as follows. For the ray which leaves wedge 14 as the ordinary ray and becomes the extraordinary ray upon entering the second wedge 16 after Faraday rotation, the deflection is calculated (using the small angle approximation) as:

$$\Phi_1=(n_o-1)\alpha_1+(n_e-1)\alpha_2. \qquad \text{Equation 2}$$

Similarly, for the ray which leaves wedge 14 as the extraordinary ray and becomes the ordinary ray upon entering the second wedge 16 after Faraday rotation, the deflection is calculated (using the small angle approximation) as:

$$\Phi_2=(n_e-1)\alpha_1+(n_o-1)\alpha_2. \qquad \text{Equation 3}$$

Where the two wedges 14, 16 have the same bevel angle, such that $\alpha_1=\alpha_2$, the total deflection of the rays emerging from the second polarization selective means 16 with respect to the input optical signal may be approximated as:

$$\Phi_{total}\approx(\Phi_1=\Phi_2)\approx(n_o+n_e-2)\alpha. \qquad \text{Equation 4}$$

For the reverse propagated rays, assuming an initial reverse input ray angle of 0°, the deflection of the reverse propagated ray originating as the ordinary ray is calculated (using the sinall angle approximation) as:

$$\Phi_o^{Rev}=2\alpha(n_o-1). \qquad \text{Equation 5}$$

Similarly, the deflection of the reverse propagated ray originating as the extraordinary ray is calculated (using the sinall angle approximation) as:

$$\Phi_e^{Rev}=2\alpha(n_e-1). \qquad \text{Equation 6}$$

However, for an incident beam angle of 0°, the initial reverse input ray angle will not be at 0°, it will be $\Phi_{total}$. Therefore, the deviation of the reverse propagated ordinary ray is calculated as:

$$\Phi_{o\ total}^{Rev}=\Phi_o^{Rev}-\Phi_{total}, \qquad \text{Equation 7}$$

and the deviation of the reverse propagated extraordinary ray is calculated as:

$$\Phi_{e\ total}^{Rev}=\Phi_e^{Rev}=\Phi_{total}. \qquad \text{Equation 8}$$

After substituting Equations 4 and 5 into Equation 7, and after substituting Equations 4 and 6 into Equation 8, it can be seen that:

$$\Phi_{o\ total}^{Rev}=\alpha(n_o-n_e)=-\Phi_{e\ total}^{Rev}. \qquad \text{Equation 9}$$

Since, by definition $n_o$ is not equal to $n_e$, neither $\Phi_{o\ total}^{Rev}$ nor $\Phi_{e\ total}^{Rev}$ is equal to zero, the assumed incident beam angle. Thus, neither reverse propagated ray will couple to the initial signal path. This effect can be demonstrated by selecting typical values for the variables in the equations.

Assuming an incident beam angle of 0°, for identical wedges 14, 16 where the bevel angle ($\alpha_{1=\alpha 2}=\alpha$) is selected to be 3.5° and where the material comprising the wedges 14, 16 is selected to be rutile ($n_e$ approximately 2.710 and $n_o$ approximately 2.454), the total deflection, $\Phi_{total}$, from input to output will be approximately 11.07°. For an initial reverse propagated ray angle of 0°, the deflection, $\Phi_o^{Rev}$, of the reverse propagated ray originating as the ordinary ray will be approximately 10.18° and the deflection, $\Phi_e^{Rev}$, of the reverse propagated ray originating as the extraordinary ray will be approximately 11.97°. Thus, in the example $$\Phi_{o\ total}^{Rev}=\Phi_o^{Rev}-\Phi_{total}=10.18°-11.07°=-0.89°.$$

$$\Phi_{e\ total}^{Rev}=\Phi_e^{Rev}-\Phi_{total}=11.97°-11.07°=+0.90°.$$

Since neither of these angles is equal to zero, the assumed incident beam angle, the reflected ordinary and extraordinary rays do not couple with the input signal path. A typical optical fiber used in conjunction with the optical isolator of the present invention has a core diameter of approximately 0.8 μm. When such a typical fiber is used, a deflection of less than 1° of the reflected light signal is sufficient to prevent coupling with the incident beam to provide the requi site optical isolation.

Furthermore, utilizing an optical isolator constructed in accordance with this embodiment of the present invention and all input beam angle of approximately 5.54°, the deflected ordinary and extraordinary ray will emerge from the second means 16 at approximately 5.54°. Thus, by employing beveled graded index lenses, which are well known and form no part of the present invention, an in-line assembly is possible.

Figure 2:
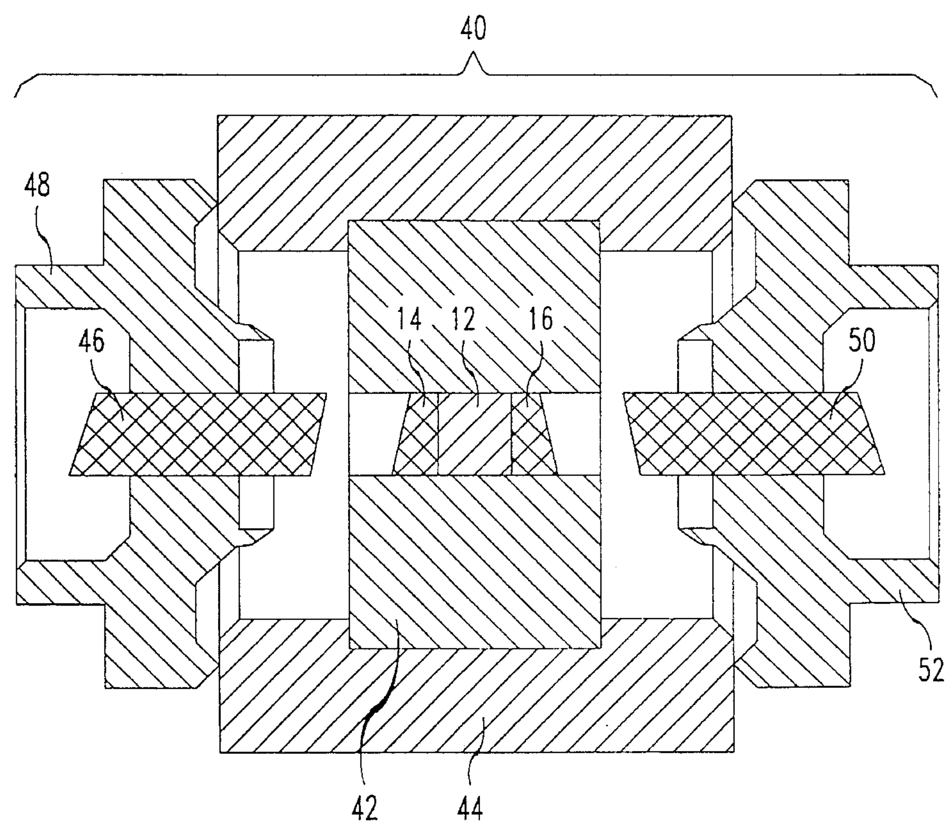
FIG. 2 illustrates an exemplary packaged optical isolator of the present invention.
Figure 3:
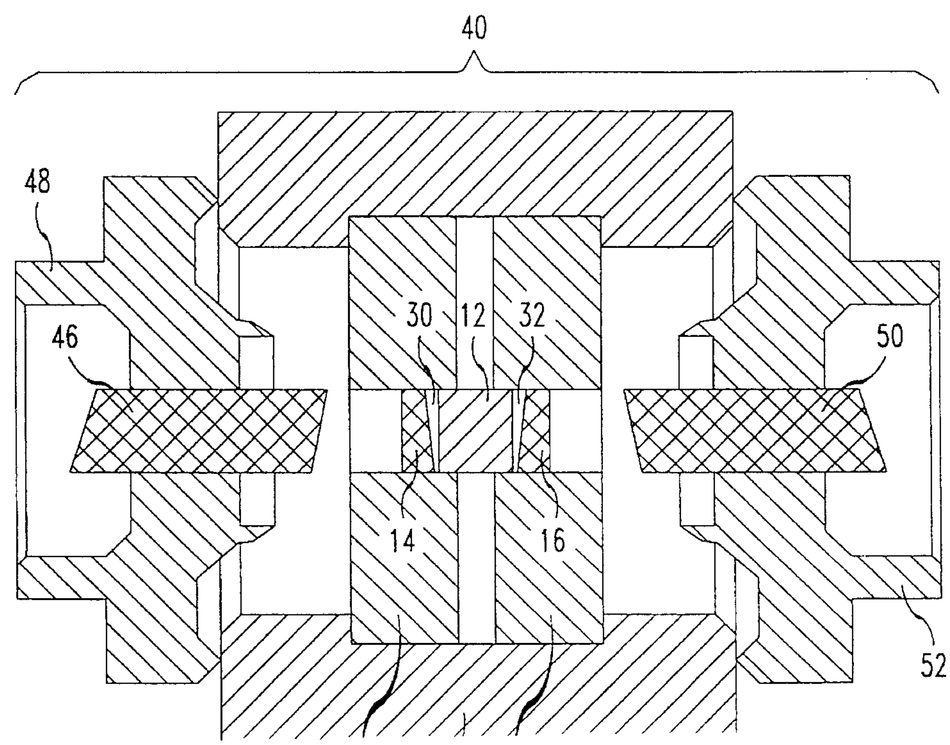
FIG. 3 illustrates an alternative embodiment of a packaged optical isolator of the present invention.

FIG. 2 illustrates an exemplary packaged isolator 40 constructed in accordance with the present invention. First polarization selective means or birefringent wedge 14 and second polarization selective means or birefringent wedge 16 are adjacent or juxtaposed to the Faraday rotor 12 so that the planar surface 22 of wedge 14 and the planar surface 23 of wedge 16 both abut or contact the Faraday rotor 12. An optically transparent and anti-reflective adhesive or other material is preferably used to join the Faraday rotator 12 to the two wedges 14, 16. Alternatively, as shown in FIG. 3, the first polarization selective means or birefringent wedge 14 and second polarization selective means or birefringent wedge 16 may be mounted so that there are gaps 30, 32 between surfaces 22, 23 of respective wedges 14, 16 and the Faraday rotator 12 or so that there is a gap between one wedge 14 or 16 and the Faraday rotator 12. Alternatively, as shown in FIG. 3, both wedges 14, 16 may be rotated 180° so that the beveled surfaces 18, 20 are adjacent the Faraday rotator 12 and so that gaps 30, 32 are disposed between the wedges 14, 16 and the Faraday rotator 12. When there is a gap between the Faraday rotator 12 and either or both wedges 14, 16, the adjacent surfaces are preferably coated with an optically transparent and anti-reflective material.

Referring to FIG. 2, wedges 14, 16 and Faraday rotator 12 are disposed within a bore in a magnet 42 which provides a magnetic field to the magneto-optic material comprising the Faraday rotator 12 thereby causing the requisite 45° rotation of the ordinary and extraordinary rays. The magnet 42 is fixed or secured within an outer housing or package 44. Alternatively, the position of the magnet 42 relative to the Faraday rotator 12 may be adjustable so that the Faraday rotator 12 may be fine tuned. Such an adjustable magnet is disclosed in U.S. Pat. No. 5,111,330 which is incorporated herein by reference. Alternatively, as shown in FIG. 3, magnet 42 may be comprised of two magnets **42*a* and 42*b*, the positions of which may be fixed or adjustable. An input transmission element 46 is mounted and appropriately positioned within a fixture 48 attached to the input end of the outer package 44 to form a collimated beam for reception by first polarization selective means 14. Similarly, an output transmission element 50 is mounted and appropriately positioned within a fixture 52 that is attached to the opposite or output end of the outer package 44 to form a focused beam from second polarization selective means 16**.

Packaged isolator 40 may also incorporate additional elements or means to form a focused beam or to compensate for the net beam deflection for example by using beveled graded index lenses and/or appropriately aligning or tilting the input and output fiber and lens assemblies.

Figure 4:
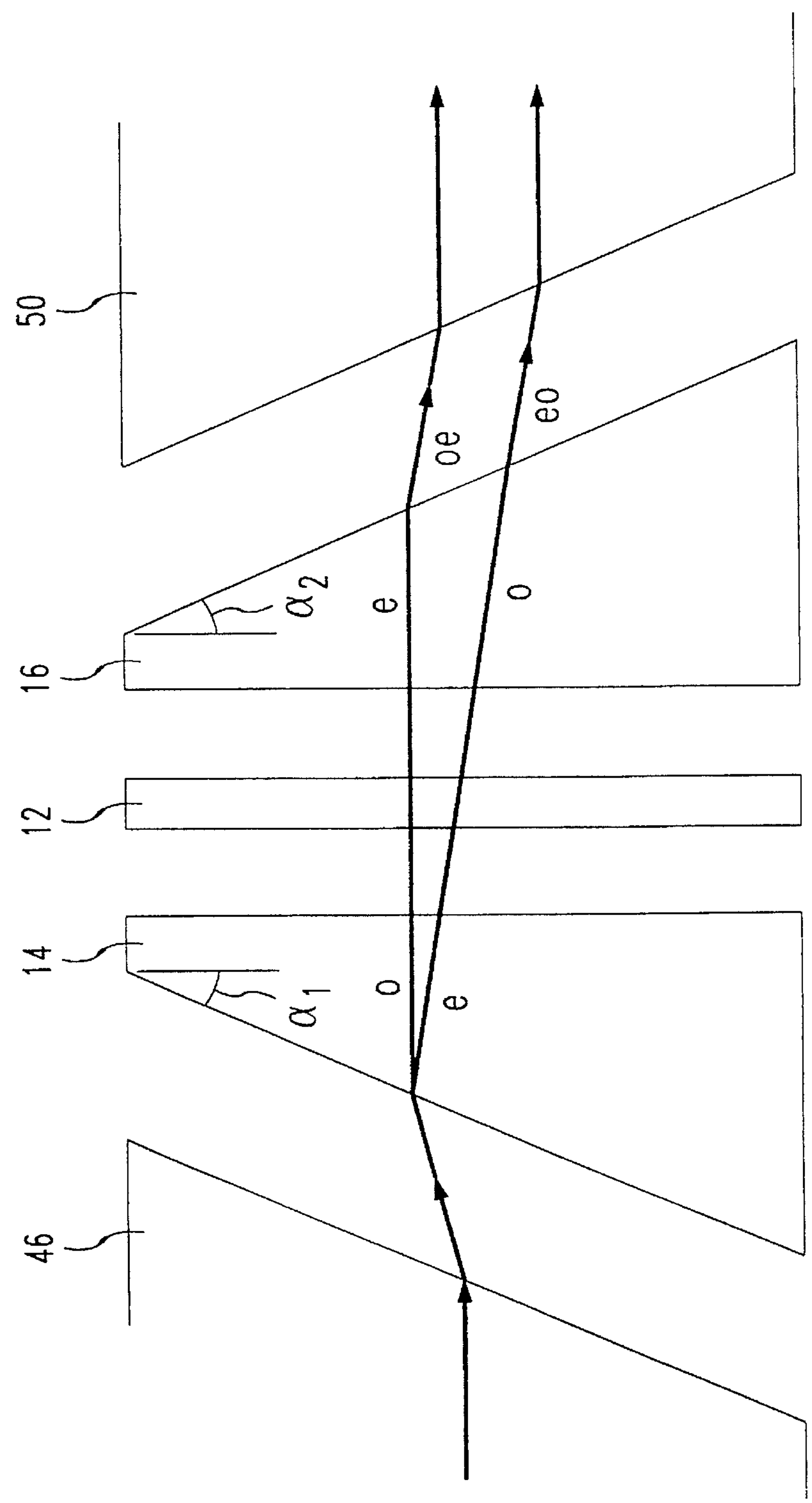
FIG. 4 depicts an optical isolator formed in accordance with the teachings of the present invention, with the directional paths of the light rays of interest passing through the isolator conceptually illustrated.

In FIG. 4, a representative diagram conceptually illustrates the direction of the light rays passing through the optical isolator 10 of the instant invention.

Although packaged isolator 40 has been shown and described as an in-line assembly, arrangements otller than in-line may also be used. In such embodiments, the two wedges 14, 16 and the Faraday rotator 12 are not positioned in a straight line, but instead one or more light defracting or reflecting elements are interposed between or among the elements. Consequently, the light signal will travel, for example, in a curved or L-shaped path and the edge 19 of the first birefringent wedge 14 will not be parallel to the edge 21 of the second birefringent wedge 16. In these alternative embodiments of the present invention, the required relative orientations of the two wedges 14, 16 is selected so that the required exchange of polarization states occurs as the light signal enters the second birefringent device 16 alter leaving the Faraday rotator 12. It will be recognized and understood that similar results may also be obtained utilizing materials other than those which are currently preferred and herein disclosed for forming the polarization selective means 14, 16. Where such other materials are employed, there must be a sufficient difference in the refractive indices $n_e$ and $n_o$ of the material, and each polarization selective means should have appropriate respective wedge angles, $\alpha_1$ and $\alpha_2$, as, by way of example, seen in Equations 2 through 9, to ensure that the reverse propagated rays do not couple into the signal path. Similarly, where wedge 14 is comprised of a material different from wedge 16, the shapes of the wedges are selected to take into account their respective refractive indices to ensure that the path lengths travelled by the two polarization states of the optical signal are substantially equal, thereby substantially eliminating polarization mode dispersion. Additionally, although the optical axis of the second birefringent wedge 16 is disclosed as being rotated by 45° in a counterclockwise direction relative to the optical axis of the first birefringent wedge 14 and the Faraday rotator as rotating the signal 45° in a clockwise direction, both of these directions of rotation may alternatively be reversed.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. An optical isolator adapted for receiving an applied forward-directed optical signal, said optical isolator comprising:

a first birefringent wedge having a first optical C-axis oriented at a first optical axis angle, a first face, a second face and a width defined between said first and second faces and varying from a first width at a first end to a second width less than said first width at a second end, said first wedge being oriented so that said second end is oriented in a first direction and so that the applied forward-directed optical signal enters said first wedge through said first face and the forward-directed optical signal entering the first wedge through said first face is divided into a first polarization state and a second polarization state orthogonal to said first polarization state and said first and second polarization states exit said first wedge through said second face;

a Faraday rotator disposed proximate said first birefringent wedge for receiving said first and second polarization states exiting said first wedge and from which said first and second polarization states exit after passage through said Faraday rotator in which said first and second polarization states undergo a nonreciprocal 45° rotation; and a second birefringent wedge having a first face, a second face, a width defined between said first and second faces of the second wedge and varying from a third width at a first end of the second wedge to a fourth width less than said third width at a second end of the second wedge, and a second optical C-axis oriented at a second optical axis angle, said first and said second optical C-axes being oriented relative to each other such that the difference between said first and said second optical axis angles equals 45° in a rotational direction opposite said nonreciprocal rotation of said Faraday rotator, said second wedge being oriented so that said second end of the second wedge is oriented in said first direction, and said second wedge being disposed proximate said Faraday rotator so that said first and second polarization states exiting said Faraday rotator enter said second wedge through said first face of said second wedge and exit said second wedge through said second face of said second wedge;

said Faraday rotator being disposed between said first and second birefringent wedges so that the first and second polarization states of the applied forward-directed optical signal undergo an exchange of identities in passing through the optical isolator in that said second polarization state exiting said second birefringent wedge is orthogonal to said second polarization state exiting said first birefringent wedge and said first polarization state exiting said second birefringent wedge is orthogonal to said first polarization state exiting said first birefringent wedge, and such that the first and second polarization states exit said second birefringent wedge in parallel relation, each having travelled through said optical isolator over respective optical paths of substantially equal length, with substantially no polarization mode dispersion.

2. The optical isolator of claim 1, wherein said first polarization state comprises an ordinary wave and said second polarization state comprises an extraordinary wave.

3. The optical isolator of claim 1 wherein said first wedge includes at first edge, and said first optical C-axis of said first wedge is oriented at an angle of approximately +22.5° relative to said first edge.

4. The optical isolator of claim 1, wherein said birefringent wedges comprises $TiO_2$.

5. The optical isolator of claim 1, wherein said first wedge and said second wedge have the same shape.

6. The optical isolator of claim 1 wherein said first wedge includes a first edge, and said first optical C-axis of said first wedge is oriented at an angle of approximately 0° relative to said first edge.

7. The optical isolator of claim 1, wherein said first wedge abuts said Faraday rotator.

8. The optical isolator of claim 7, wherein said second wedge abuts said Faraday rotator.

9. The optical isolator of claim 1, wherein said second wedge abuts said Faraday rotator.

10. The optical isolator of claim 1, wherein sai first wedge is comprised of a material different than that comprising said second wedge.

* * * * *